United States Patent [19]

Neubauer

[11] Patent Number: 5,574,347
[45] Date of Patent: Nov. 12, 1996

[54] APPARATUS FOR LOCOMOTION IN ENCLOSED SPACES

[75] Inventor: Werner Neubauer, Munich, Germany

[73] Assignee: Siemens Aktiengesellschaft, Munich, Germany

[21] Appl. No.: 489,005

[22] Filed: Jun. 8, 1995

Related U.S. Application Data

[63] Continuation of Ser. No. 156,713, Nov. 24, 1993, abandoned.

[30] Foreign Application Priority Data

Nov. 27, 1992 [DE] Germany .......................... 42 39 987.4

[51] Int. Cl.[6] .............. H02J 17/00; B62D 57/02
[52] U.S. Cl. ................ 318/568.12; 318/568.1; 180/8.1; 901/1
[58] Field of Search ...................... 318/560–640, 318/16; 901/1, 3, 5, 7, 9, 15–23, 45–49; 395/80–99; 180/8.1–8.9; 378/60; 331/21 R; 340/310 R, 854, 60, 18 CD

[56] References Cited

U.S. PATENT DOCUMENTS

| 4,527,650 | 7/1985 | Bartholet . | |
|---|---|---|---|
| 4,662,465 | 5/1987 | Stewart | 180/8.1 |
| 4,674,949 | 6/1987 | Kroczynski | 414/750 |
| 4,826,392 | 5/1989 | Hayati | 901/9 |
| 4,828,059 | 5/1989 | Naito et al. | 180/119 |
| 4,993,913 | 2/1991 | Ohtsuki | 414/729 |
| 5,005,658 | 4/1991 | Bares et al. | 180/8.1 |
| 5,040,626 | 8/1991 | Paynter . | |
| 5,124,918 | 6/1992 | Beer et al. | 901/1 X |
| 5,127,484 | 7/1992 | Bares et al. | 180/8.1 |
| 5,304,899 | 4/1994 | Sasaki et al. | 318/16 |
| 5,325,031 | 6/1994 | Tilden | 318/568.11 |
| 5,335,557 | 8/1994 | Yasutake | 73/862.043 |

FOREIGN PATENT DOCUMENTS

| 4-101791 | 4/1992 | Japan . |
| 2 230 357 | 10/1990 | United Kingdom . |

*Primary Examiner*—Paul Ip
*Attorney, Agent, or Firm*—Hill, Steadman & Simpson

[57] ABSTRACT

An apparatus having a highly autonomously, self-moving system which reacts flexibly to impediments in the environment. It must be specifically noted in this context that such apparatus were known not used in shafts or channels and that the nature of the motion on the basis of bracing legs and motions of further legs represents a special advantage over apparatus that were known standards. Particular economic success could be achieved by marketing this apparatus in nuclear power fields, conduit technology or medical applications.

14 Claims, 6 Drawing Sheets

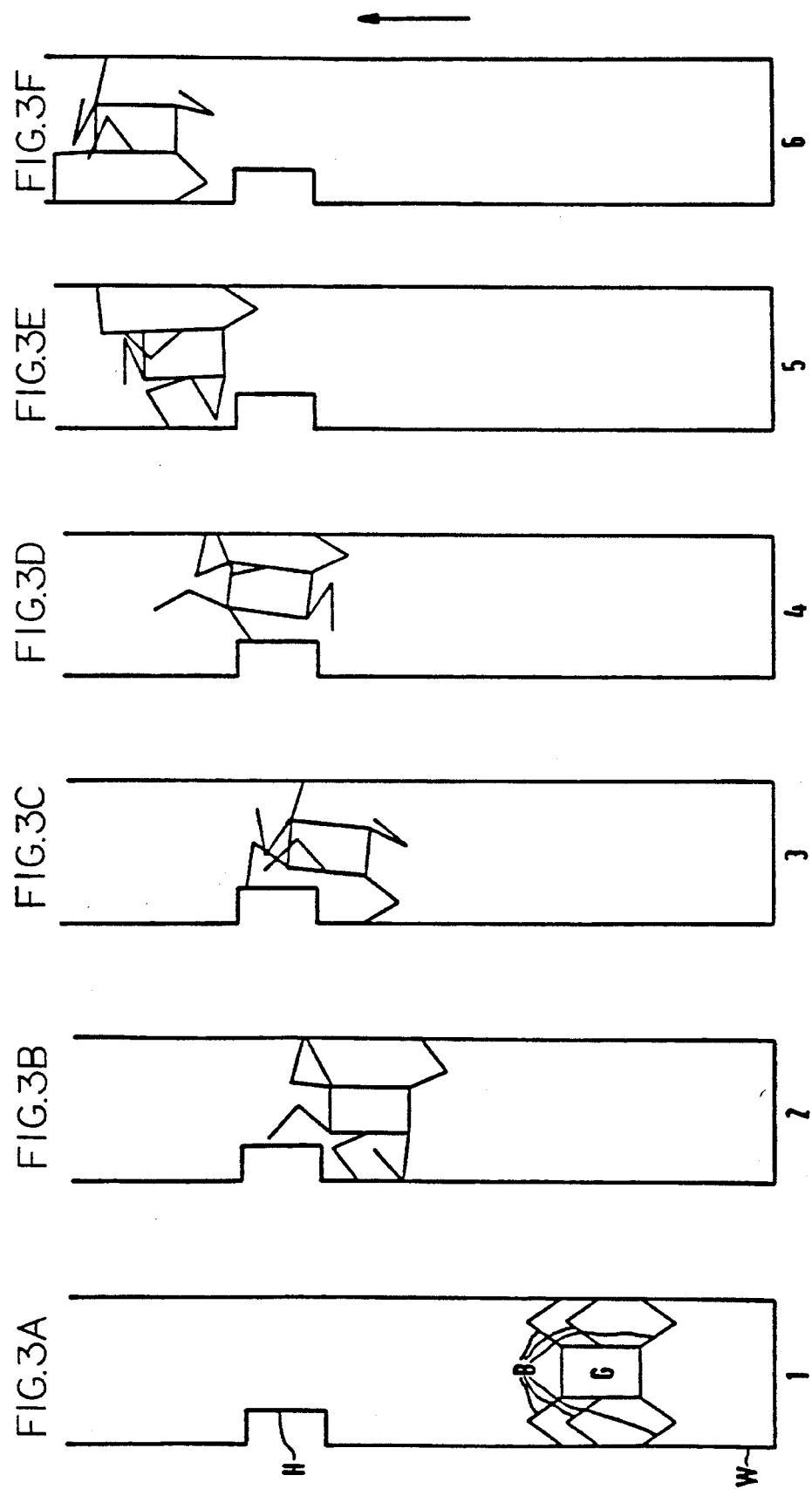

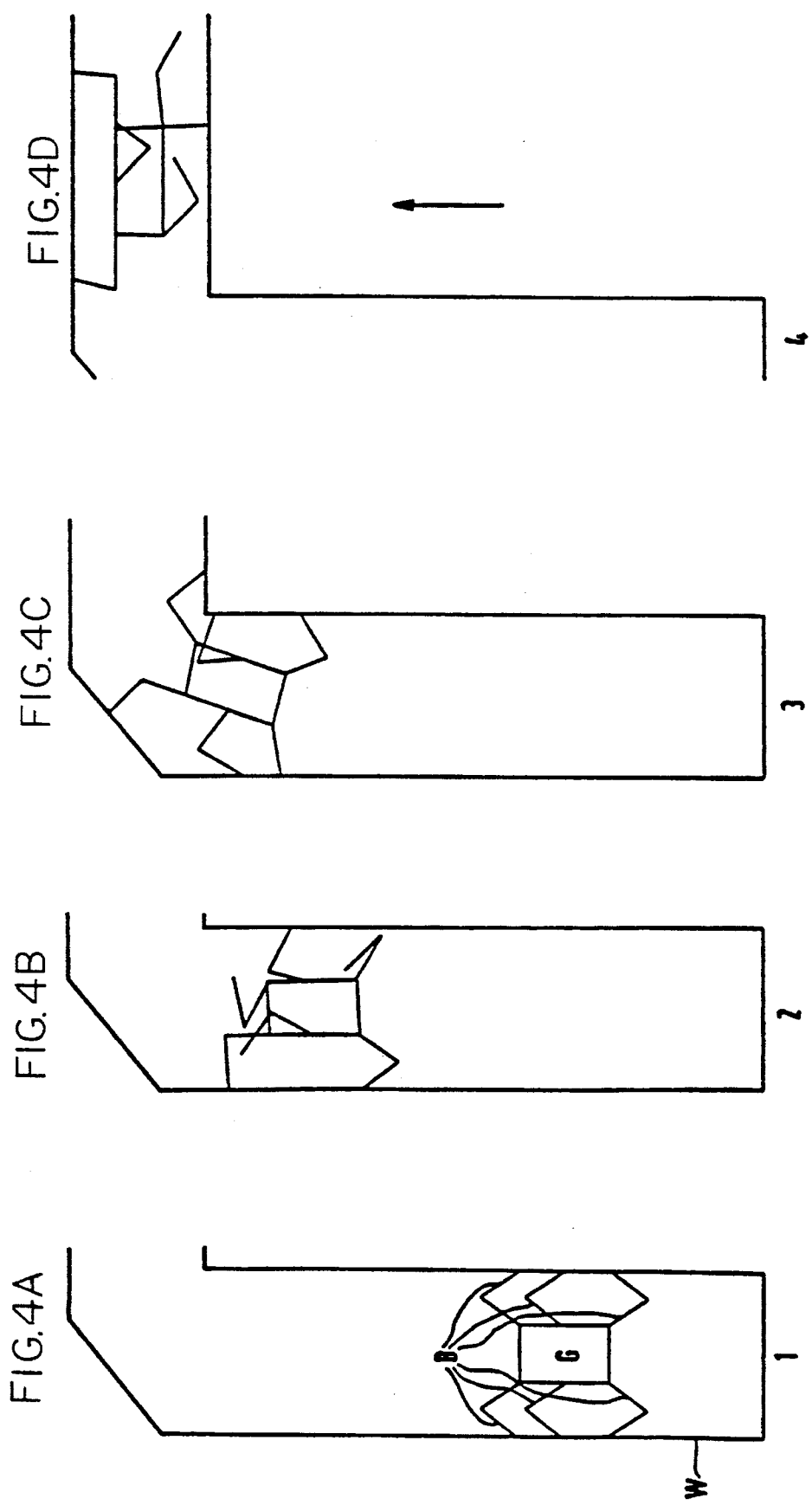

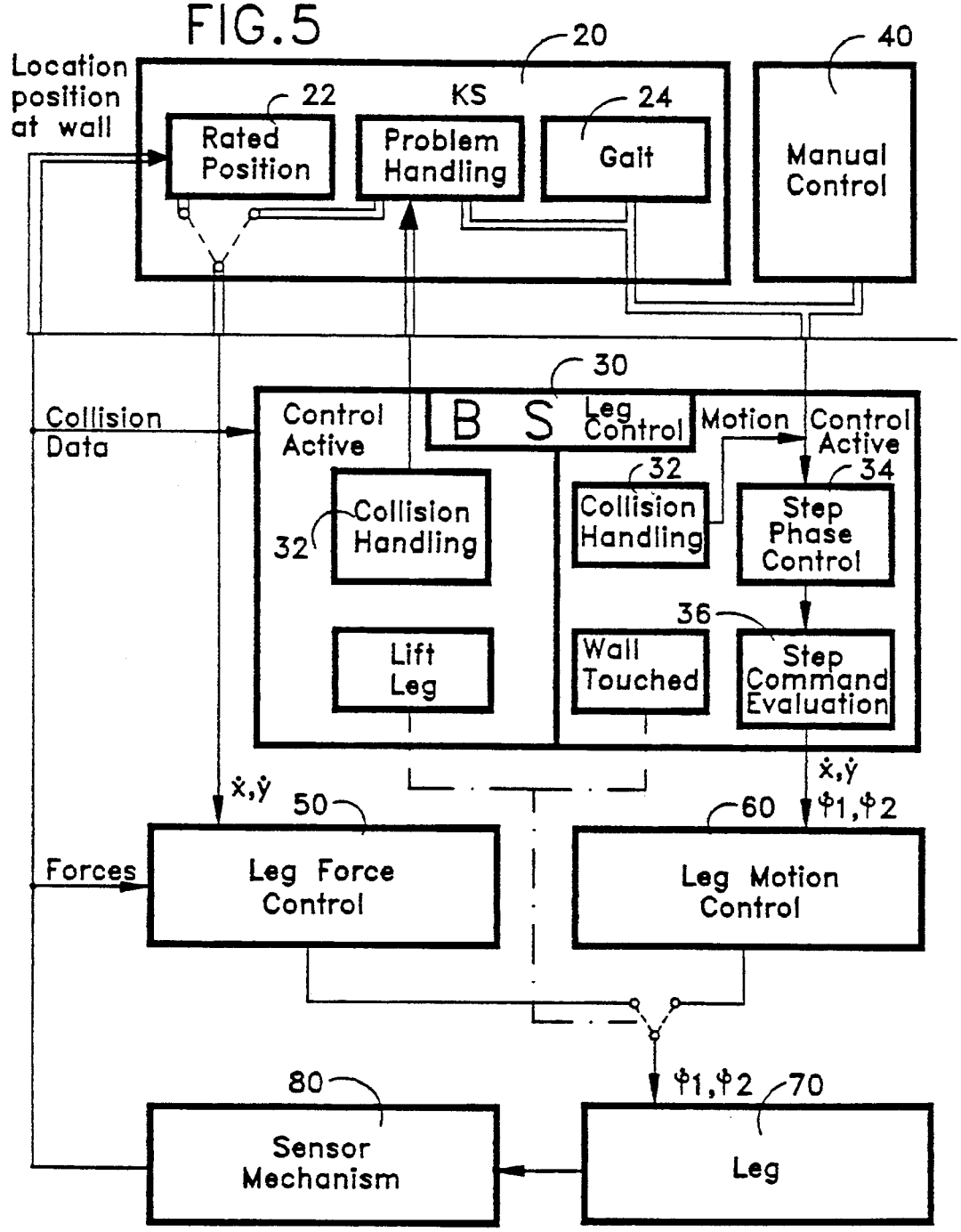

APPARATUS FOR LOCOMOTION IN ENCLOSED SPACES

This is a continuation of application Ser. No. 08/156,713, filed Nov. 24, 1993, now abandoned.

BACKGROUND OF THE INVENTION

1. Field of the Invention

The present invention is directed generally to robotics and specifically to a highly autonomous, self-moving system capable of flexibly reacting to impediments in hazardous environments.

2. Description of the Prior Art

Robots currently perform a great variety of activities. For example, such robotic activities include installing electronic components on electronic assemblies or welding chassis elements in automobiles. A property that most robots share is that they are permanently mounted at one location. It is desirable in some applications, however, to provide the robots with a certain mobility. For example, these are job areas in which personal hazards are to be avoided or job areas which are inaccessible or dangerous for humans. For example, such areas can be the insides of pipelines, etc.

Robots having on-board sensors (for example, video cameras) and tools are particularly useful for service (inspection and repair) of pipes (power plants, chemical plants, wastewater, drinking water, pipelines) and shafts (air shafts, waste disposal systems). In addition to the data transmission and the energy supply (cable or battery), the locomotion of the robot represents a principal problem. There are a great variety of suggested approaches for resolving this problem. Most of these robots for servicing pipes use driven pressure rollers or caterpillars that are supported against the pipe walls with spring power. Tubular arcs having a radius greater than 1.5 times the diameter of the tube can be traveled with this known method. "T" and "Y" branchings, highly contaminated or damaged pipes, great modifications of the pipe cross section, as well as arbitrarily shaped cavities cannot be overcome with these known devices.

A further approach for resolving this locomotion problem has two members with hydraulic cylinders spread against the walls in alternation which execute a caterpillar-like locomotion. However, this approach does not overcome the aforementioned impediments. For resolving the locomotion problem in air shafts, the frame fitting into the shaft was previously inserted with the assistance of a fiberglass rod. Further advancement after a few curves and after about 50 meters was thereby impossible. A targeted navigation for overcoming branchings was not possible in any of the proposals.

SUMMARY OF THE INVENTION

It is the object of the present invention to provide an apparatus with high mobility in impassable spaces that can be designationally navigated.

It is another object of the present invention to provide an apparatus with high mobility for locomotion between subsurfaces lying substantially opposite one another (i.e., opposing walls of a pipe or channel) and that is designationally navigable. The apparatus of the present invention is also capable of locomotion in a vertical direction, for example, in a vertical pipe by supporting itself with at least two legs while moving with the other legs.

One particular advantage of the apparatus of the invention is that it clamps itself in a surrounding space with its articulated legs. This assures a maximum degree of flexibility for overcoming impediments located in the space.

Another object of the invention is to advantageously provide a position sensor in the apparatus of the invention so that the motion of the apparatus need not be planned in advance. Tactile sensors can be advantageously used as position sensors to simply identify collisions of the apparatus. Using a sensor for monitoring the rated position of the apparatus of the invention is also advantageous because specific problem situations can be reacted to in a specific way as a result thereof.

It is a further object of the invention to provide coupling of a sensor to the leg control of the apparatus to provide the advantage of having individual legs react to impediments independently of one another.

Another object of the present invention is to provide the use of force sensors in the apparatus of the invention to advantageously provide power-saving operation.

Further, using moment sensors at the legs of the apparatus of the invention has the advantage of providing well-metered motion and prompt recognition of impediments in the leg region.

Using angle transmitters at the legs of the apparatus of the invention has the advantage of providing the exact position of the individual legs to the central control.

Using the apparatus of the invention for locomotion is especially advantageous in pipes or channels, since these are difficult for humans to access and since particular flexibility is achieved due to the autonomous nature of the apparatus of the invention and the type of motion used.

The above objects are inventively achieved in an apparatus for locomotion in enclosed spaces having a base member with at least three legs, each with at least two articulations, distributively attached over the circumference of the base member; at least one leg control for controlling the leg motion sequence of each leg; and a central control for controlling the locomotion and coordination of the leg controls, wherein the central control controls locomotion in alternation of the leg controls by repeatedly initiating at least two of the legs to brace themselves against at least one surface and by placing at least one other leg in motion to drive different leg controls for bracing and moving.

BRIEF DESCRIPTION OF THE DRAWINGS

The invention shall be set forth in greater detail below with reference to figures.

FIG. 3 shows an apparatus of the invention that evades an impediment in an environment.

FIG. 4 shows an apparatus of the invention that goes around the corner in an environment.

FIG. 5 shows an exemplary embodiment of a control of an apparatus of the invention.

DESCRIPTION OF THE PREFERRED EMBODIMENT

Figure 1:
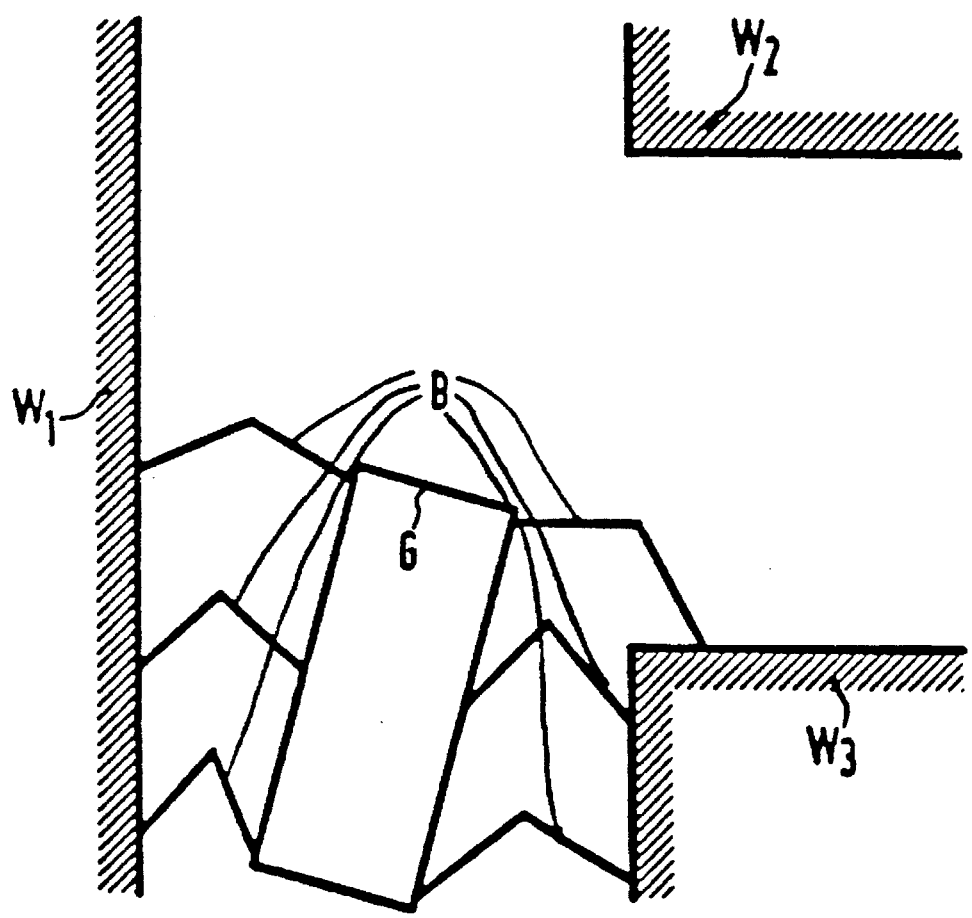
FIG. 1 shows an exemplary embodiment of an apparatus of the invention in an environment that has surfaces.
Figure 2A:
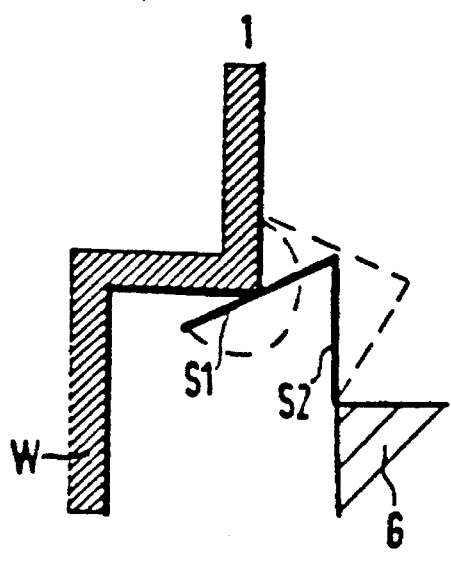
FIG. 2 shows the leg motion behavior of an apparatus of the invention in conjunction with occurring impediments.
Figure 2B:
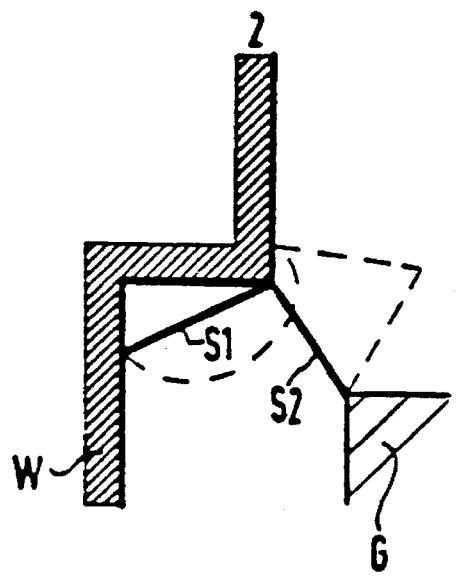
Figure 2C:
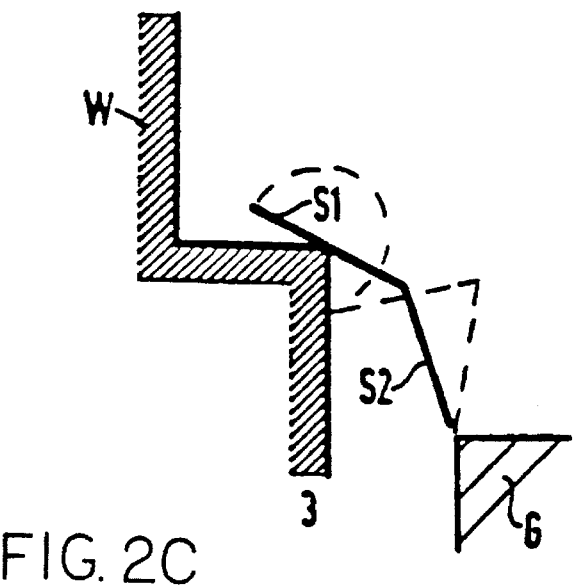
Figure 2D:
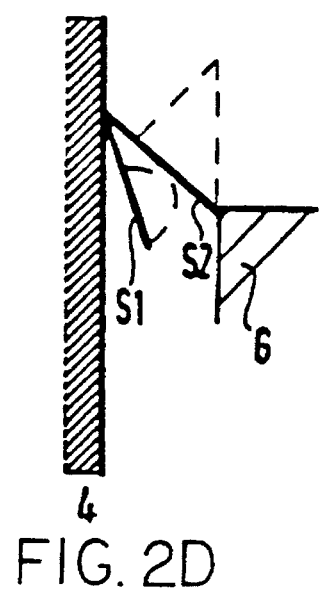

FIG. 1 shows an apparatus of the invention having a base member G and legs B in an environment having wall surfaces W1 through W3. At the same time, FIG. 1 represents an example of a typical case in which traditional locomotion solutions fail. The walls W1 and W2 and W3 of the environment form a T-member here. A decision must be made regarding the direction in which the apparatus of the invention should move. It can continue moving either between W2 and W3 or between W1 and W2. The selection of the direction occurs by prescribing the corresponding direction to the central control of the apparatus of the invention. It then initiates the motion of the individual legs via the leg controls, where these legs support themselves against the appropriate walls. As a result of the coordination with the assistance of the central control, the apparatus of the invention is steered in the desired direction.

Four collision situations of legs of an apparatus of the invention with walls are shown in FIG. 2. These four collision situations are referenced 1 through 4. Further, walls W and the leg of an apparatus of the invention with base member G and limbs S1 and S2 are shown.

In case 1, the limb S1 of a leg of the apparatus of the invention strikes against an edge of the wall W. A correction execution of the motion of the leg is now not possible; the motion of S1 and S2 along the illustrated, broken line is thus initiated by the leg control.

In case 2, a knee joint that is located between S1 and S2 strikes against an edge of a wall W. A leg motion is now no longer possible. The leg control therefore initiates the limbs S1 and S2 to move along the broken lines.

In case 3, a limb S1 of the apparatus of the invention strikes against the edge of a wall W. The motion of the limb S1 is impeded by the edge; the leg control can identify this, for example, on the basis of moment sensors. A signal of the moment sensor then causes the leg control to move the limbs S1 and S2 along the broken lines.

In case 4, a knee joint that is located at a leg between S1 and S2 strikes against the wall W. The motion of the leg is impeded, so that this can lead to a momentary overload of the drive unit of the leg. This is identified, for example, by a moment sensor that is provided at an articulation of this leg. This moment sensor sends a signal to the leg control. In order to initiate the correct motion of the leg limbs S1 and S2, a motion of these two limbs is initiated along the broken lines. Without limiting the functioning of the apparatus of the invention, however, other sensors can also be provided for registering motion. Such sensors, for example, are contact switches, ultrasound sensors or video cameras.

After the collisions in the exemplary cases just discussed have been overcome, the motion of the apparatus of the invention along the prescribed direction can again be controlled via the leg controls and can thereby be continued, coordinated by the central control.

FIG. 3 shows the motion of the apparatus of the invention in a space that contains an impediment. This space, for example, can be an air shaft or a water channel. Six chronologically successive snapshots are shown that are continuously numbered in ascending sequence according to the time lapse. In this example, the apparatus of the invention moves in an upward direction. However, it can also move horizontally or in a downward direction. The impediment H and the apparatus of the invention having the base member G and legs B, as well as the wall of the space W are shown. It can then be seen that the apparatus of the invention moves along the space. The central control of the apparatus thereby prescribes a direction of motion to the leg controls and these leg controls then activate the individual legs in succession in a way previously defined by the central control. For example, it can be defined that only two legs brace themselves against the wall and the other four legs move forward. However, it can also be defined that three legs brace themselves and three further legs seek a new hold. An embodiment of the invention having six legs is shown here. However, other numbers of legs are also possible.

In snapshot 2, the apparatus approaches the impediment. For example, the sensors in the leg recognize the impediment and a special treatment for avoiding the impediment is initiated at the leg control. This leads to a displacement of the base member, as can be seen in case 3, and to a corresponding leg motion of the remaining legs. The flexibility of movement of the apparatus of the invention through such environments may be seen with reference to the individual snapshots. The apparatus of the invention avoids the impediment without any difficulty.

The motion of an apparatus of the invention in a space that contains a bend is shown in FIG. 4. As shown in FIG. 3, the wall is referenced W and the apparatus of the invention and the base member thereof are referenced G and the legs B. Snapshots are also shown that are successively numbered in ascending fashion according to the lapse of time. In this case, the space proceeds in an upward direction. It can be symmetrical—as shown here—or it can also be asymmetrical. Forward movement of the apparatus, as it braces some legs and moves other legs in order to seek a new support, can be recognized with reference to the individual snapshots. For example, in snapshot 2, three legs are bracing and three other legs are seeking new possibilities for bracing.

As soon as the apparatus of the invention—as shown in snapshot 3—arrives at the bend, the legs move in the way shown therein at the appropriate walls and find a support. Snapshot 4 shows how the apparatus of the invention has moved past the bend. Such 90° bends thus represent no impediment whatsoever for such an apparatus. Without limitation of its functioning, the apparatus of the invention can also have a different base member or a different number of legs.

FIG. 5 shows an exemplary embodiment of the control of an apparatus of the invention. The central control 20 is referenced KS and the leg control 30 is referenced BS. In addition, a manual control 40 is provided. A rated position 22 and a gait 24 are prescribed via the crawler control KS 20 depending on an existing problem. The hierarchy can be clearly seen in FIG. 5. The control KS ranks higher than the leg control BS in this case. The leg control BS receives, for example, the instruction "step" from the control KS and also receives collision data from the outside via the sensor mechanisms of the leg. Collision handling 32 as well as step phase control 34 and step instruction evaluation 36 are provided in the leg control 30. In this exemplary case, the control of the motion occurs via a sensing by the legs of the wall on the basis of proximity switches or the like. A regulation of the leg force is also provided by a leg force control 50 which sets the force at the respective legs to be braced such that a bracing is effected with respect to the base member and the surrounding surface. The force must therefore be greater than the force of gravity that acts on the apparatus of the invention. Further, a leg motion control 60 is provided which drives the leg motors of the various leg limbs The leg motion control 60 and the leg force control 50 are connected to the leg 70 which is connected to a sensor mechanism 80. The sensor mechanism 80 provides inputs (i.e., location positions, collision data and forces) to the central control 20, the leg control 30 and the leg force control 50. It may be clearly seen with reference to the example of the hierarchic control of an apparatus of the invention shown here how finely graduated the invention can react to unforeseen problems, as was set forth in FIGS. 3 and 4 with reference to the motion of the invention.

Quite contrary to previously standard apparatus for locomotion in spaces, reactions to an environment are extremely flexible in this case, i.e. autonomy is maximized in the apparatus of the invention.

Figure 6:
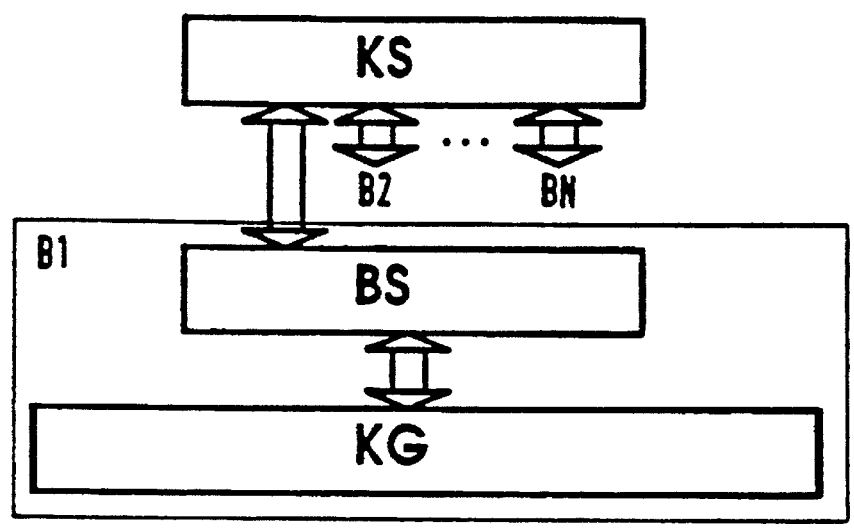
FIG. 6 shows another exemplary embodiment of a control of an apparatus of the invention.

As FIG. 6 shows, the control of the apparatus of the invention is hierarchically subdivided. Each hierarchy level has maximum autonomy in order to obtain a more reactive or even reflex-like behavior on the lower levels and more planning behavior on the higher levels. This means that the jobs or occurring problems are solved in the lowest possible hierarchy level. Reflex-like behavior produces ruggedness, tolerance to errors and speed of the control. The control is designed such that a meaningful behavior of the apparatus of the invention is established regardless of the number of legs.

The first of three hierarchy levels is formed by a central control KS that is responsible for the entire apparatus of the invention. It coordinates the leg motions and controls the position of the body. Each leg B has a leg control BS and a force/speed control KG that forms the second and third levels. The leg control controls the step execution and the rated forces of the leg. Given collisions with impediments, the legs or, the body avoids in a reflex-like manner. The force/speed control KG controls the rated force or, respectively, the rated speed of the foot prescribed by the leg control.

Leg Control

The leg control BS has, for example, two parts, the standing leg control and the step control. They are activated in alternation dependent upon whether the leg is a standing leg at the moment or not.

Standing Leg Control

As a result of the simplified sensor mechanisms, the leg, for example, receives no information about the angle of the wall. Only the force component perpendicular to the longitudinal axis of the apparatus is therefore controlled. As long as the leg is intended to hold the body, the rated force with which a leg should brace itself against the wall perpendicularly relative to the longitudinal axis of the apparatus derives from $$F_n = F_{rated}/S$$

whereby S is the plurality of standing legs on the same side. The position control of the body is also added to this rated force. The control commands for the position control are supplied by the higher-ranking, central control KS.

The force control perpendicular to the longitudinal axis of the apparatus, however, does not prevent individual legs from sliding down because of the lack of information about the angle of the wall. The apparatus of the invention can thereby lose its sure footing. A mechanism was therefore developed that prevents slipping without planning and with purely reflex-like behavior in most cases.

First, when a foot is placed, the distance from the neighboring feet that are standing against the pipe wall is measured and is kept constant from this point by adding an additional force. A slipping of individual legs can thus be prevented unless all legs of one side simultaneously lose their footing.

On the other hand, the rated force $F_n$ is first set to zero for a leg that should lift. The force control now attempts to carefully unload the leg. When the leg can reduce its force to zero within a specific time $T_a$, then it assumes that the other legs have held the apparatus. The standing leg control and the force control of the leg are inactivated and the step control and speed control retract the leg. If the leg has not yet become free of force after the time $T_a$ has elapsed, then it is necessary for the apparatus to stand in a stable way and remain against the wall as a standing leg. This careful lifting of the leg makes it possible for the apparatus to never retract an important standing leg without planning and coordination of the legs and thereby lose its footing. When a leg cannot be lifted even after repeated attempts and thereby prevents continued crawling, a message is forwarded to the control of the apparatus of the invention which gets a neighboring leg to help.

When a standing leg collides with the pipe wall, then the leg control reports to the control that an evasive motion of the body is necessary and the direction of the evasive motion. After the central control has modified the position of the apparatus to such an extent that this leg is collision-free, the leg control automatically initiates an evasive step in order to correct the poor position of the leg. First, however, the central control KS is asked whether or not all legs on this side should lift simultaneously.

Figure 7:
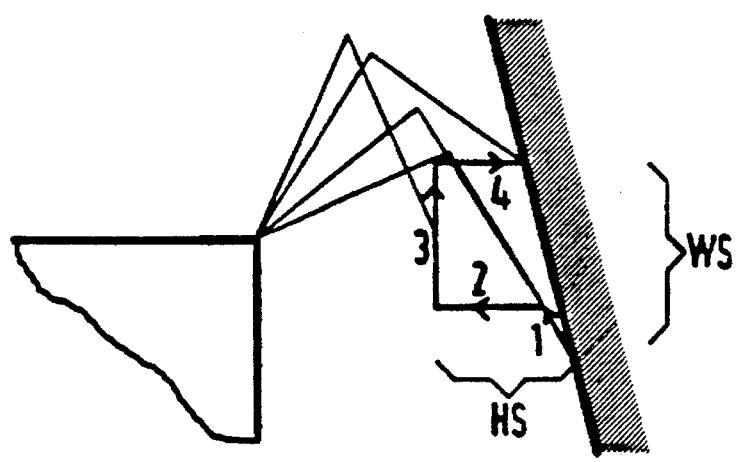
FIG. 7 shows an example of a step control of an apparatus of the invention.

FIG. 7 shows an example of a step control of an apparatus of the invention. The step control distinguishes, for example, between five different modes of motion.

1. Oblique retraction: after the leg releases from the wall, the foot point of the leg is retracted for a short time in the direction of the outer limb. Collisions when lifting the leg are thus avoided.

2. Retraction: the foot point of the leg is retracted perpendicularly relative to the longitudinal axis of the apparatus.

3. Swinging: the foot point moves in the longitudinal axis.

4. Stretching: the foot point moves perpendicular to the longitudinal axis against the wall.

5. Seeking: when the wall is not found with the extended leg, then the extended leg moves opposite the running direction. A new, longer step is initiated at the end of the working range.

Upon initiation of a step, the two parameters of step height HS and step width WS are forwarded to the leg (see FIG. 4). The leg now carries out the step taking the kinematic limitations of the leg into consideration. Two additional rules thereby assure that the prescribed goals are reached:

when the foot touches the wall before the desired step width has been achieved, the leg immediately initiates a somewhat higher step.

when the foot touches the wall during the "retraction" mode, a switch is made to the mode of "oblique retraction".

When a collision occurs during the stepping of a leg, the leg control immediately initiates an evasive step.

Although other modifications and changes may be suggested by those skilled in the art, it is the intention of the inventor to embody within the patent warranted hereon all changes and modifications as reasonably and properly come within the scope of his contribution to the art.

I claim:

1. Apparatus for locomotion in an enclosed space defined by at least a first surface and a second surface wherein the first surface is substantially parallel to the second surface defining an interior of the enclosed space, said apparatus comprising:

a base member having at least three legs, each with at least two degrees of articulation, distributively attached over the circumference of said base member;

at least one leg control means controlling leg motion sequence of each leg, said each leg being movable relative to said surfaces of said enclosed space and capable of contacting said first surface and said second surface simultaneously; and crawler control means for controlling the locomotion and coordination of said leg control means in alternation by repeatedly initiating at least two of said legs to brace themselves against at least one said surface of said enclosed space to support said base member and by placing at least one other leg in motion to respectively drive different leg controls for bracing and moving the other leg to provide said locomotion of said base member.

2. Apparatus according to claim 1, said apparatus having at least one sensor means for controlling the locomotion.

3. Apparatus according to claim 2, wherein said at least one sensor means is connected to said central control means for providing sensor information to said control means to control at least one of a rated position or a gait.

4. Apparatus according to claim 2, wherein said at least one sensor means is connected to said leg control means for providing sensor information to said leg control means for triggering at least one of a collision handling control or a step phase control.

5. Apparatus according to claim 2, wherein said sensor means comprises force sensors for monitoring said bracing.

6. Apparatus according to claim 2, wherein said sensor means comprises moment sensors for registering the motion moments of at least one leg.

7. Apparatus according to claim 2, wherein said sensor means comprises angle transmitters for sensing and transmitting the position of at least one leg with reference to said base member.

8. Apparatus according to claim 1 for providing locomotion in pipes or channels.

9. Apparatus according to claim 1, for providing vertical locomotion in pipes or channels.

10. A method of providing locomotion of a crawler robot having at least three legs, each with at least two degrees of articulation distributively attached over the circumference of the crawler robot in an enclosed space defined by at least a first surface and a second surface, wherein the first surface is substantially parallel to the second surface to define an interior of the enclosed space, the method comprising the steps of:

moving at least two of said legs to contact said first surface and said second surface simultaneously to support said crawler robot within the interior of the enclosed space;

placing at least one other leg in motion while said at least two legs remain braced against said first surface and said second surface; and controlling the locomotion of the crawler robot by alternatively repeating said moving and placing steps to provide locomotion of the crawler robot.

11. An apparatus for locomotion in an enclosed space defined by at least a first surface and a second surface wherein the first surface is substantially parallel to the second surface defining an interior of the enclosed space, said apparatus comprising:

a base member having at least three legs, each with at least two degrees of articulation, distributively attached over the circumference of said base member;

a sensor means connected to each leg for sensing locomotion parameters and providing signals indicative of said parameters;

a crawler control means constructed and arranged to receive said signals from said sensor means;

a leg force control means, constructed and arranged to receive said signals from said sensor means, for selectively setting a force on at least one selected leg of said at least three legs;

a leg motion control means connected to each of said at least three legs for selectively driving each of said at least three legs;

a leg control means, constructed and arranged to receive said signal from said sensor means, for coordinating leg motion of said at least three legs by providing control signals to said leg motion control means;

wherein said crawler control means coordinates said leg control means in alternation by repeatedly initiating at least two of said legs to brace themselves against at least one said surface of said enclosed space to support said base member and by placing at least one other leg in motion to respectively drive different leg controls for bracing and moving the other leg to provide said locomotion of said base member.

12. The apparatus of claim 11, further comprising:

a manual control means connected to the crawler control means and the leg control means for permitting manual control of said apparatus.

13. The apparatus of claim 11, further comprising:

means for controlling a step execution of at least one of said at least three legs incorporated into said leg control means; and a force/speed control means for controlling a rated force and rated speed of at least one of said at least three legs by using said control signals from said leg control means.

14. The apparatus of claim 11, wherein said leg control means further comprises:

a standing leg control means; and a step control means, wherein said standing leg control means and said step control means are activated in alternation by said crawler control.

\* \* \* \* \*